Figure 1:
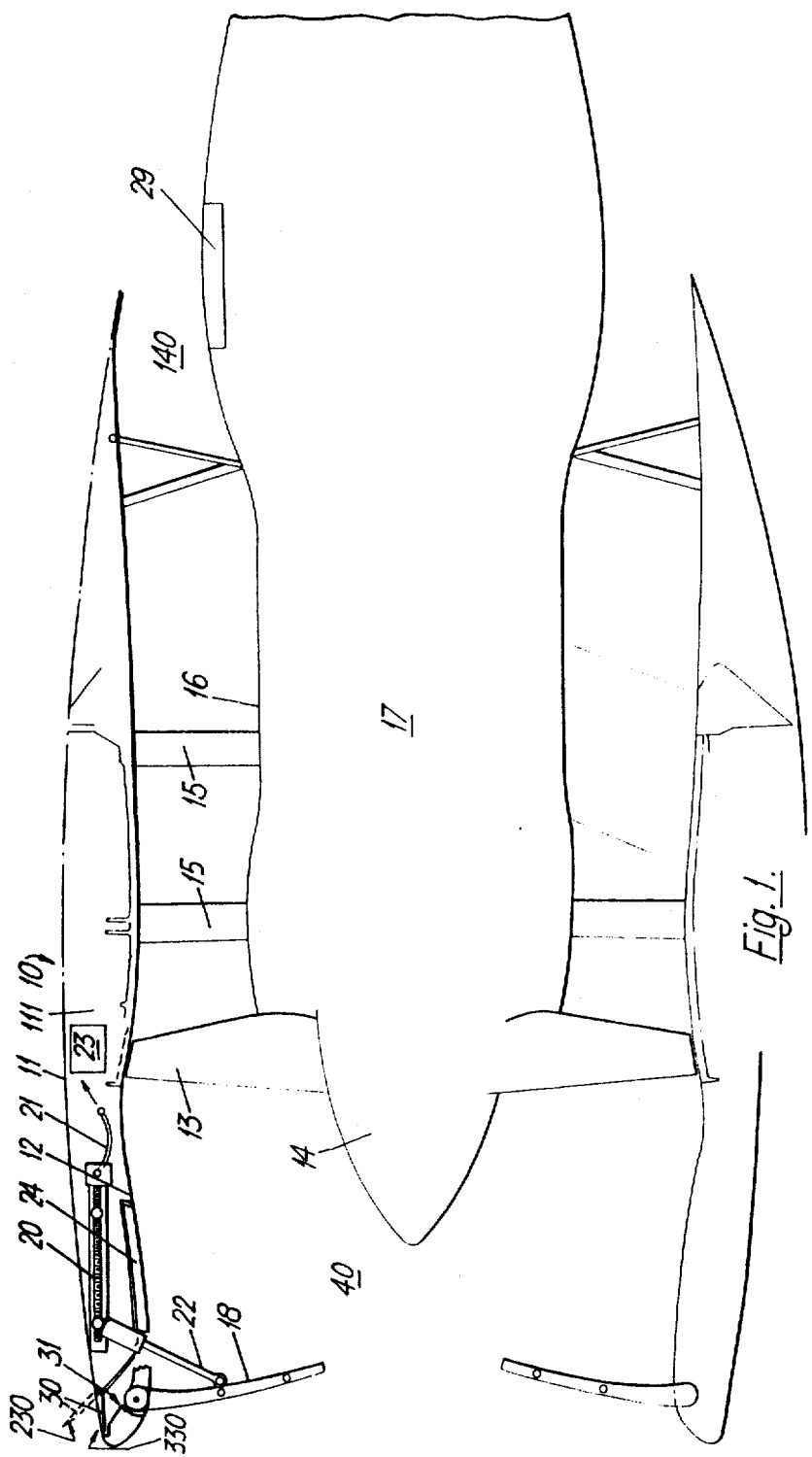

United States Patent
Poucher et al.

[15] 3,662,556
[45] May 16, 1972

[54] GAS TURBINE ENGINE

[72] Inventors: Michael Poucher, Duffield; Leslie John Brooks, Aston-On-Trent; Geoffrey William Morris, Breaston, all of England

[73] Assignee: Rolls-Royce Limited, Derby, England

[22] Filed: Jan. 12, 1971

[21] Appl. No.: 105,808

[30] Foreign Application Priority Data

Jan. 14, 1970  Great Britain..................1,842/70

[52] U.S. Cl.....................60/226 R, 60/39.29, 60/269, 137/15.1, 181/33 HA, 415/119
[51] Int. Cl........................F02k 3/04, F02k 11/00
[58] Field of Search............137/15.1, 15.2; 60/226 R, 39.29, 60/269; 244/53.8; 415/119; 181/33 HA

[56] References Cited

UNITED STATES PATENTS

| | | | |
|---|---|---|---|
| 3,222,863 | 12/1965 | Klees | 60/39.29 |
| 3,325,997 | 6/1967 | Freeman | 60/226 R |
| 3,532,100 | 10/1970 | Ward | 137/15.1 |
| 3,572,961 | 3/1971 | Medawar | 60/269 |
| 3,610,262 | 10/1971 | Wise | 137/15.1 |

FOREIGN PATENTS OR APPLICATIONS 921,127  3/1963  Great Britain ..................181/33 HA Primary Examiner—Douglas Hart
Attorney—Cushman, Darby & Cushman

[57] ABSTRACT

A gas turbine power plant includes an outer casing having an upstream end and a downstream end, a main air intake adjacent the upstream end and a gas outlet at the downstream end of said outer casing, first obturating means movable between an inoperative position wherein it is fully retracted so as not to interfere with a flow of air through said main air intake and an operative position wherein it extends partially to obturate the said main air intake, an auxiliary air intake defined in said outer casing, second obturating means movable between an operative and an inoperative position respectively to permit and to prevent ingress of air into said auxiliary air intake, and powered means for moving said first and second obturating means so that they are both in their respective operative positions substantially at the same time and in their respective inoperative positions substantially at the same time, and when in their operative positions increase the average velocity of the ingested air but to below Mach 1 under standard take-off and landing engine speeds.

15 Claims, 6 Drawing Figures

PATENTED MAY 16 1972

3,862,556

SHEET 1 OF 3

Inventor
MICHAEL POUCHER, LESLIE
JOHN BROOKS, GEOFFREY WILLIAM MORRIS
By
Cushman Darby Cushman
Attorneys

GAS TURBINE ENGINE

This invention relates to a gas turbine engine, particularly to a gas turbine engine for aircraft in which the operational noise level can be reduced, such as at take-off and landing of the aircraft.

It is known that one source of noise emanating from aircraft gas turbine engines is due to the phenomenon known as "wake interaction" which is caused by wakes created by rotating blades of the engine interacting with stationary blades or vanes and also with the wakes created by the blades of successive or adjacent rotor stages. The noise created by wake interaction is of sonic frequency and often finds its way out of the engine through the front or upstream end thereof.

According to the present invention there is provided a gas turbine power plant including an outer casing, a main air intake adjacent the upstream end of said outer casing, first obturating means movable between an inoperative position wherein it is fully retracted so as not to interfere with the flow of air through said main intake and an operative position wherein it extends partially to obturate the said main intake, an auxiliary air intake defined in the said outer casing, second obturating means movable between an operative and an inoperative position respectively to permit and to prevent ingress of air into said auxiliary intake, and powered means for moving said first and second obturating means so that they are both in their respective operative (or inoperative) positions substantially at the same time, the arrangement of the first and second obturating means being such that in their operative position the average velocity of the ingested air is increased but remains below Mach 1.

It will therefore be appreciated that sonic frequency noise due to wake interaction between rotating and stationary parts of the engine coming out through the front of that engine is substantially reduced or eliminated by causing the sonic waves to "collide" with and be attenuated by the incoming ingested air the velocity of which is matched, or approximately matched to that of the sonic waves.

Preferably powered means is provided for varying the area of said outlet and is so co-ordinated with the powered means for moving said first and second obturating means that, in operation, on reducing the area of the said main intake and increasing the area of said outlet by a predetermined amount, respectively, while the said average velocity of the ingested air is increased to a near-sonic value, the power output of the engine remains substantially constant.

The first-mentioned powered means may be common to both first and second obturating means and may include a ram connected to said first obturating means via a shock absorbing link.

The first obturating means may include a plurality of pivotally mounted grid-like sections through which air may flow.

In one alternative preferred embodiment, the first-mentioned powered means is controlled by an air pressure sensor.

In another alternative preferred embodiment, the first-mentioned powered means is controlled by signals representative of engine speed and inlet air temperature.

The first-mentioned obturating means preferably includes a ring of intake flaps which in said operative position extend substantially radially inwardly to permit the flow of air into said main intake only through an unobstructed central portion thereof.

Control means may be provided for controlling the diffusing angle of the ingested air when said first obturating means is in its operative position.

Preferably said control means includes means for blowing air into the region of the main intake behind the main intake flaps when the latter are in their operative position.

Optionally, the said means for varying the outlet area includes an axially translatable annular member which is movable between an inoperative position in which it forms a substantially uninterrupted continuation of the outer casing, and an operative position in which it is axially translated relative to the outer casing to form an annular thrust-spoiling gap between itself and the downstream end of said casing.

Additionally, or alternatively, the said means for varying the area of the outlet may include a ring of angularly spaced apart, power-actuatable outlet flaps which are movable to vary the said outlet area.

The engine is preferably a front fan engine including a front fan and a gas generator; the said outer casing may then be the fan casing.

Alternatively, the said outer casing may be the casing of the gas generator which is surrounded in part by and in spaced relationship with the fan casing, the said ring of outlet flaps being substantially in the same radial plane as the downstream end of said fan casing and being adapted to move radially inwardly from their inoperative position, wherein they substantially merge with the gas generator casing, to their operative or outlet-area-increasing position.

Preferably, the said main intake and the said auxiliary intake are located sufficiently upstream of the most upstream rotor stage, or fan, of the power plant for any wakes caused by the first obturating means in its operative position to be substantially smoothed out before reaching the said rotor stage or fan.

The invention also includes an aircraft provided with a gas turbine power plant as set forth above.

Figure 2:
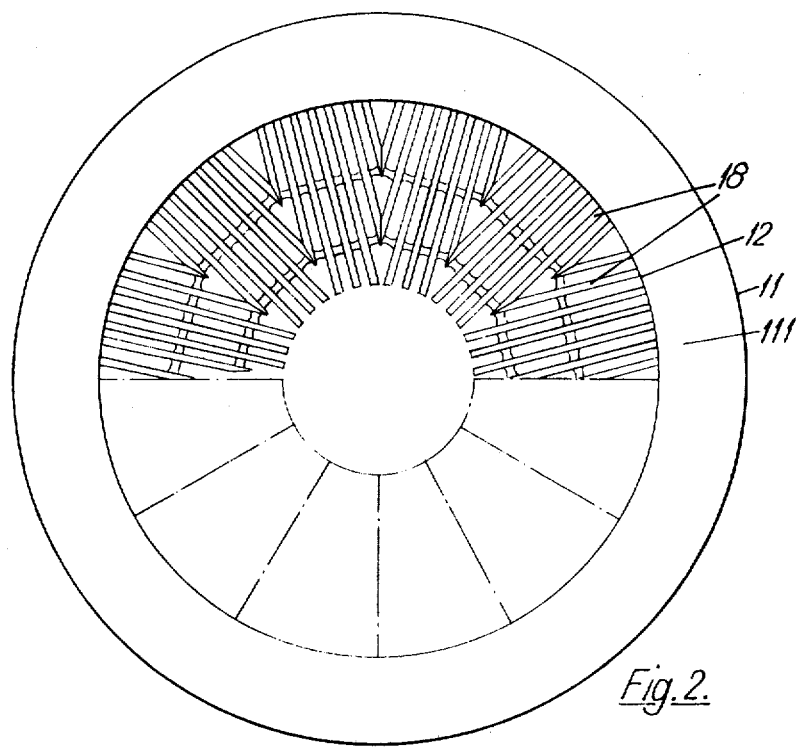
Figure 3:
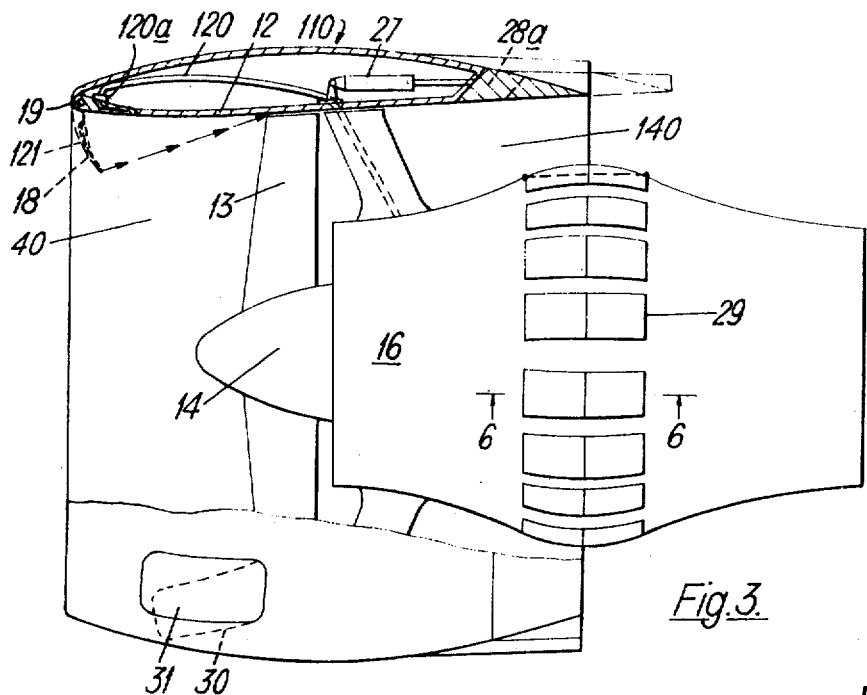
Figure 4:
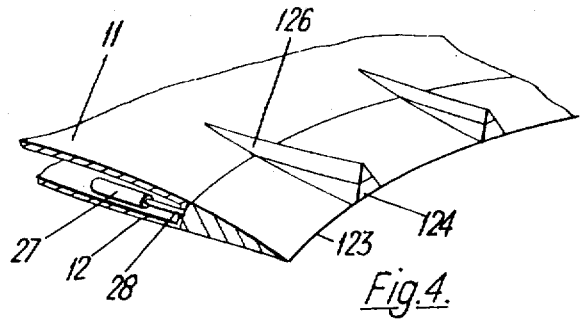
Figure 5:
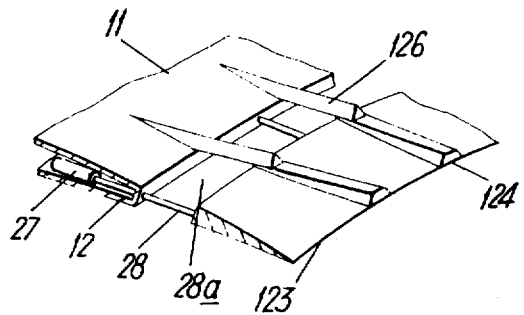
Figure 6:
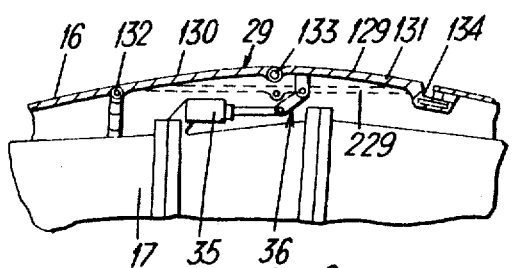

The invention will be illustrated, merely by way of example, with reference to the accompanying drawings, in which:

FIG. 1 is a somewhat schematic axial section through one embodiment of a power plant of the present invention, FIG. 2 is a front elevation of the power plant of FIG. 1, FIG. 3 is a broken away elevational view, partly in section, of a front fan gas turbine jet propulsion power plant in accordance with another embodiment of the present invention, FIG. 4 is a part-sectional, part-elevational view on an enlarged scale of part of the power plant shown in FIG. 3, and showing the outlet area varying means in its inoperative position, FIG. 5 is a view corresponding to FIG. 4, but showing the outlet area varying means in its operative position, and FIG. 6 is a partly sectional, partly elevational view of a part of the power plant shown in FIG. 1.

Referring first to FIGS. 1 and 2 of the drawings, there is shown a gas turbine power plant 10 of the front fan type, the power plant 10 having an annular fan casing 111 comprising an outer wall 11 and an inner wall 12 which defines the fan duct. The fan casing partly surrounds a gas generator casing 16 within which is mounted a gas generator 17 in the form of a substantially conventional gas turbine engine. Upstream of the gas generator 17 there is a fan rotor stage 13 mounted on a hub 14 so as to be coaxial with the gas generator 17. The gas generator casing 16 is secured to the wall 12 of the fan casing by means of substantially radially extending aerofoil-shaped struts 15 located downstream of the fan rotor stage 13.

The upstream end of the fan duct is provided with a ring of grid members (also referred to as "flaps") 18 mounted for pivotal movement about respective pivots 19 and movable by means of a ball-screw and nut type jack or ram 20 adapted to be actuated through a connection 21 from an air motor which may in a preferred embodiment be associated with an air pressure sensor shown schematically at 23. The screw jack 20 is pivotally connected to approximately the center of each grid member 18, and the connecting link 22 is in the form of a shock absorber against impact of birds or other foreign bodies being ingested. FIG. 1 shows the grid members 18 in their extended or operative positions in which they extend substantially radially inwardly so as to leave a central unobstructed portion of the main air intake 40, the fan casing being provided with recesses 24 into which the grid members 18 can be retracted in their inoperative positions so that they merge with the fan casing.

In another preferred embodiment (not shown) the jack 20 is replaced by pneumatic or, preferably, hydraulic rams.

FIG. 2 shows more clearly the shape of the grid members 18, and it can be seen that they are in a form which permits air to flow therethrough. Each adjacent pair of grid members define a throat therebetween through which the air must flow.

When an aircraft provided with a power plant 10 is about to (i.e. or take off, and it is desired to reduce the operational noise level to a minimum, the grid members 18 are moved from their inoperative to their operative positions in which they reduce the area of the intake. This reduction of the area of the intake causes the average velocity of the ingested air to increase as it flows through the throats defined between the grid members 18, and in all preferred embodiments of the present invention it is desired to cause the average velocity of the ingested air to reach near-sonic values, preferably of the order of 0.8 to 0.85 Mach. It will be appreciated that as a result of the average air velocity being of near-sonic value, the sonic waves i.e., the noise) coming out of the engines through the intake are very substantially attenuated by the air entering the power plant in the opposite direction and at a speed nearly the same as that of the sonic waves.

However, in certain operating conditions of the aircraft, actuation of the grid members 18 to reduce the area of the intake may cause certain problems. Thus, in the case of an aircraft about to land and there being a headwind, in order to maintain the speed of the aircraft at the desired value, the power setting or throttle must be increased, and this will cause the gas generator 17 to rotate faster, causing a corresponding increase in the speed of rotation of the fan 13 and an increase in mass flow through the intake.

However, increase in the speed of rotation of the fan 13 could cause the ingested air to exceed the said desired average velocity and to reach, or even to exceed, a velocity of Mach 1, thereby causing shock wave to appear at the upstream end of the intake or at the flaps. Such a shock wave is, of course, highly undesirable, since it causes serious intake pressure losses.

In the present invention, this problem is solved by providing on the radially outer wall 11 of the fan casing a ring of flaps 30 which are movable between an inoperative position 330, shown in full lines in FIG. 1, in which they merge with the outer wall 11, and an operative position 230, shown in dotted lines, in which they uncover an annular gap 31 in the fan casing, the gap 31 constituting an auxiliary intake. To effect movement of the flaps 30, the latter are connected to the jack 20 so that the grid members 18 and flaps 30 will move to their respective operative (or inoperative) positions substantially simultaneously.

It will be appreciated that the auxiliary intake 31 will, in effect, off-load the main intake 40 defined by the inner wall 12 of the fan casing to provide extra air for ingestion and to prevent the formation of shock waves. A further advantage of the provision of an auxiliary intake 31 is that air ingested therethrough will relieve or eliminate any turbulence caused immediately downstream of the grid members 18.

The downstream end of the fan duct may be provided with a fixed nozzle, or alternatively, and preferably, it may be provided with a variable area two-position nozzle, generally indicated at 140 in FIG. 1 and constituted by a fixed fan casing and a contractible flap arrangement 29 on a bulbous portion of the gas generator casing 16. The flap arrangement is generally similar in principle with that described in connection with FIG. 6 below and will not therefore be described in detail. The provision of a two-position nozzle 140 enables the mass flow to be increased for a given thrust, by setting the nozzle to its larger area position. This in turn will have the effect of reducing the mass flow through the auxiliary intake 31, whereby the grid-like doors may be reduced in size to save weight and space.

Referring now to the embodiments illustrated in FIGS. 3 to 6, wherein parts corresponding to those of the embodiments of FIGS. 1 and 2 have the same reference number, the power plant 110 is substantially similar to power plant 10 and therefore only the differences will be described in detail.

The upstream end of the fan duct is provided with a plurality of angularly spaced apart flaps 30 and a ring of flaps 18 mounted for pivotal movement about respective pivots 19, and movable by means of a ram (not shown), and a link mechanism which may be similar to that described in connection with the embodiment of FIGS. 1 and 2. In FIG. 3, full lines show the inoperative position of the flaps 18 wherein they substantially merge with, and form the continuation of, the inner wall 12 of the fan duct, dotted lines indicating the operative position of the flaps 18, in which they partially obturate the upstream end of the fan duct, that is to say the main intake to the power plant 110, and in which no air can flow between or through the flaps 18, i.e. they form a solid annular wall.

When an aircraft provided with a power plant 110 is about to land or take off, and it is desired to reduce the operational noise level to a minimum, the flaps 18 and 30 are moved from their inoperative to their operative positions in which they respectively reduce the area of the main intake, and open the auxiliary intake 31. This action will, as expressed above, and for the reasons stated, cause the average velocity of the ingested air to reach near-sonic values, preferably of the order of 0.8 to 0.85 Mach.

However, operation of the flaps 18 to reduce the area of the main intake would of itself cause turbulence in the ingested air. This turbulence can be reduced if the size of the flaps is also reduced so that an average ingested air velocity of 0.8 to 0.85 Mach may still be obtained, but only by increasing the mass flow through the engine for a given engine thrust. However, for the power plant 110 of this embodiment the available increase in mass flow is insufficient for achieving the desired average ingested air velocity for given thrust requirements without the provision of the flaps 18. Moreover, the said air velocity must not reach a sonic value, because that would produce a shock wave at or adjacent the flaps 18 which is, as already stated, highly undesirable because it causes intake pressure losses.

In order therefore to prevent the occurrence of a shock wave and to achieve an average ingested air velocity of about 0.8 to 0.85 Mach, the size of the flaps 18 is so chosen that the effective main intake area is larger than that which gives in the desired average air velocity, but this is compensated for by increasing the mass flow of air through the fan rotor stage 13. This increase in mass flow is achieved, in addition to the provision of the auxiliary intake 31, by increasing the outlet area of the fan duct, and FIGS. 4 to 6 illustrate two methods of doing this, which methods may be used either independently of each other or, in some circumstances, together. However, the two embodiments described below and shown respectively in FIGS. 4 and 5 on the one hand and FIG. 6 on the other hand are intended to be alternatives to each other, although they are shown together in FIG. 3. It will be appreciated that by making the flaps 18 smaller than the size that would normally be required, the additional weight and space requirements due to the flaps 18 are minimized.

Turning first to the embodiment shown in FIGS. 4 and 5, the downstream end of the fan casing is provided with an axially translatable annular portion 123 which is substantially triangular in section. On the radially outer surface of the portion 123 there is provided a ring of angularly spaced apart substantially wedge-shaped members 124 the radially outer surfaces of which may slide relative to the radially inner bearing surfaces, respectively, of a ring of angularly spaced apart members 126 of substantially triangular section. The downstream ends of said members 126 are secured to the outer wall 11 of the fan casing. To move the portion 123 axially, a plurality of rams 27 are provided, the rams 27 being located between the outer wall 11 and the inner wall 12 of the fan casing, and connected to the portion 123 by means of piston rods 28. Clearly, on actuation of the rams 27 the rods 28 will be extended to move the portion 123 from the position shown in FIG. 4 to the position shown in FIG. 5, with the members 124 sliding relative to the members 126. In FIG. 3, the operative and inoperative positions are respectively shown in dotted and full lines.

Since in the operative position the downstream end of the triangular section portion 123 is co-planar with a bulging or maximum diameter portion of the gas generator casing 16 to define a throat therebetween, on axial translation of the member 123 the downstream end thereof will be opposite a portion of the gas generator casing 16 which is of reduced diameter compared to the inoperative position, thereby increasing the outlet area. Moreover, this increase of the outlet area is accompanied by the uncovering of an annular gap 28a in the fan casing which will act as a thrust spoiler gap. The net effect is a reduction of the back pressure on the fan rotor stage 13 which as a consequence will speed up, thereby to increase the velocity and the mass of the air ingested, and so to compensate for the fact that the effective main intake area, with the flaps 18 and 30 in their operative positions, is bigger than that which would give the ingested air an average velocity of 0.8 to 0.85 Mach. Thus in this way the desired average air velocity is achieved.

Turning now to FIG. 6, as has already been stated above the gas generator casing 16 is provided with a maximum diameter in a plane which contains the downstream end of the fan casing 10. In that region of the gas generator casing 16 a ring of radially spaced apart flaps 29 are provided. As can be seen better in FIG. 4, the flaps 29 comprise two respective rings of flap members 130 and 131 arranged axially successively. The flap members 130 are hinged at their upstream ends by means of an annular hinge 132, and are connected to the downstream flaps 131 by means of an annular hinge 133. The downstream ends of the flaps 131 are connected to the outer casing 16 by a suitable connection, such as a pin-and-slot device 134.

One or more pneumatic or hydraulic rams 35 is or are secured to the engine 17 and connected by a link mechanism 36 to the flaps 131. The arrangement is such that actuation of the ram(s) 35 will cause the flaps 130 and 131 to pivot and move radially inwardly from the inoperative or full line position 129 in FIG. 6 (and FIG. 3) to the operative position 229 shown in dotted lines, whereby the throat area defined between the gas generator casing 16 and the fan casing is increased. This will have the same effect as that which has been described in connection with the embodiment of FIGS. 4 and 5, namely to reduce the back pressure on the fan 13 to cause the latter to speed up and thereby cause the air velocity ingested through the main intake to reach the desired speed.

A second problem which is caused by operation of the flaps 18 is that in their extended position they disturb the "design" diffusing angle of the ingested air in the main intake. Moreover, they may cause turbulence by causing a low pressure area to be created immediately downstream of the flaps 18. In order to compensate for this, air tapped off from the compressor means of the gas generator 17 is led through one or more of the hollow struts 15 to a flexible pipe 120 (or respective flexible pipes). The flaps 18 are provided with suitable air channels 121, and tap-off air is directed from the pipe 120 through a manifold 120a to the channels 121; from there the air is blown into the stream of ingested air so as to cause the diffusing angle of the ingested air to be restored to the correct value for the fan 13.

Moreover, it is to be noted that in all preferred embodiments of this invention the fan rotor stage 13 is set well back from the flaps 18 and therefore turbulence in the ingested air will have a chance of being smoothed out before reaching the fan rotor stage 13. It is also to be noted that the fan rotor stage 13 has no inlet guide vanes upstream of it, whereby a source of wake interaction, and thus noise, is eliminated.

We claim:

1. A gas turbine power plant including an outer casing having an upstream end and a downstream end, a main air intake adjacent the upstream end and a gas outlet at the downstream end of said outer casing, first obturating means movable between an inoperative position wherein it is fully retracted so as not to interfere with a flow of air through said main air intake and an operative position wherein it extends partially to obturate the said main air intake, an auxiliary air intake defined in said outer casing, second obturating means movable between an operative and an inoperative position respectively to permit ingress of air into said auxiliary air intake, and powered means for moving said first and second obturating means so that they are both in their respective operative positions substantially at the same time and in their respective inoperative positions substantially at the same time, and when in their operative positions increase the average velocity of the ingested air but to below Mach 1 under standard take-off and landing engine speeds.

2. A power plant as claimed in claim 1 wherein powered means is provided for varying the area of said gas outlet and is co-ordinated with the powered means for moving said first and second obturating means to maintain a substantially constant output from the gas turbine engine when said first and second obturating means are in their operative positions.

3. A power plant as claimed in claim 1 wherein the powered means for moving said first and second obturating means is common to both first and second obturating means and includes a ram and a shock-absorbing link, said ram being connected to said first obturating means via said shock-absorbing link.

4. A power plant as claimed in claim 1 wherein the first obturating means includes a plurality of pivotally mounted grid-like sections through which air may flow.

5. A power plant as claimed in claim 1 wherein the powered means for moving said first and second obturating means is controlled by an air pressure sensor.

6. A power plant as claimed in claim 1 wherein the powered means for moving said first and second obturating means is controlled by signals representative of engine speed and inlet air temperature.

7. A power plant as claimed in claim 1 wherein the first obturating means includes a ring of intake flaps which in said operative position extend substantially radially inwardly to permit the flow of air into said main intake only through an unobturated central portion thereof.

8. A power plant as claimed in claim 7 wherein control means are provided for controlling the diffusing angle of the ingested air when said first obturating means is in its operative position.

9. A power plant as claimed in claim 8 wherein said control means include means for blowing air into the region of the main air intake behind the main intake flaps when the latter are in their operative position.

10. A power plant as claimed in claim 2 wherein said powered means for varying the area of said gas outlet includes an axially translatable annular member which is movable between an inoperative position in which it forms a substantially uninterrupted continuation of the outer casing, and an operative position in which it is axially translated relative to the outer casing to form an annular thrust-spoiling gap between itself and the downstream end of said casing.

11. A power plant as claimed in claim 2 wherein said powered means for varying the area of said gas outlet includes a ring of angularly spaced apart, power-actuatable outlet flaps which are movable to vary the said outlet area.

12. A power plant as claimed in claim 1 comprising a front fan engine including a front fan and a gas generator.

13. A power plant as claimed in claim 10 comprising a front fan engine including a front fan and a gas generator and wherein said outer casing is the fan casing.

14. A power plant as claimed in claim 11 comprising a front fan engine including a front fan and a gas generator and wherein said outer casing is the casing of the gas generator which is surrounded in part by and in spaced relationship with the fan casing, the said ring of outlet flaps being substantially in the same radial plane as the downstream end of said fan casing, said flaps being adapted to move radially inwardly from their inoperative position, wherein they substantially merge with the gas generator casing, to their operative or outlet-area-increasing position.

15. A power plant as claimed in claim 12 wherein the said main intake and the said auxiliary intake are located sufficiently upstream of the most upstream fan of the power plant for any wakes caused by the first obturating means in its operative position to be substantially smoothed out before reaching said fan.

* * * * *